June 28, 1955  A. F. ALBANO  2,711,727
WATER HEATING APPARATUS
Filed May 24, 1951  2 Sheets-Sheet 1
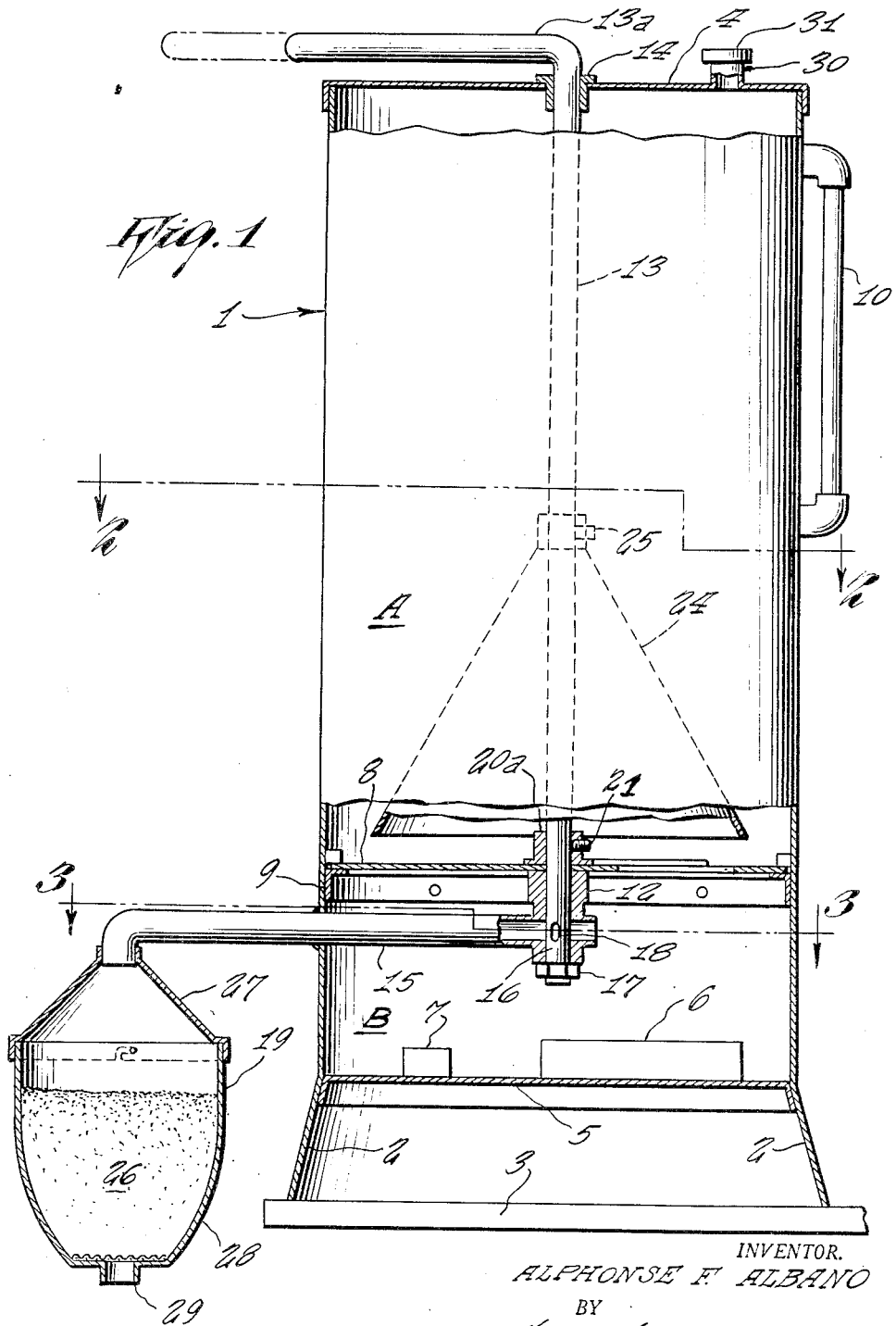
INVENTOR.
ALPHONSE F. ALBANO
BY
Moses, Nolte, Crews & Berry
ATTORNEYS June 28, 1955
A. F. ALBANO
2,711,727
WATER HEATING APPARATUS
Filed May 24, 1951
2 Sheets-Sheet 2
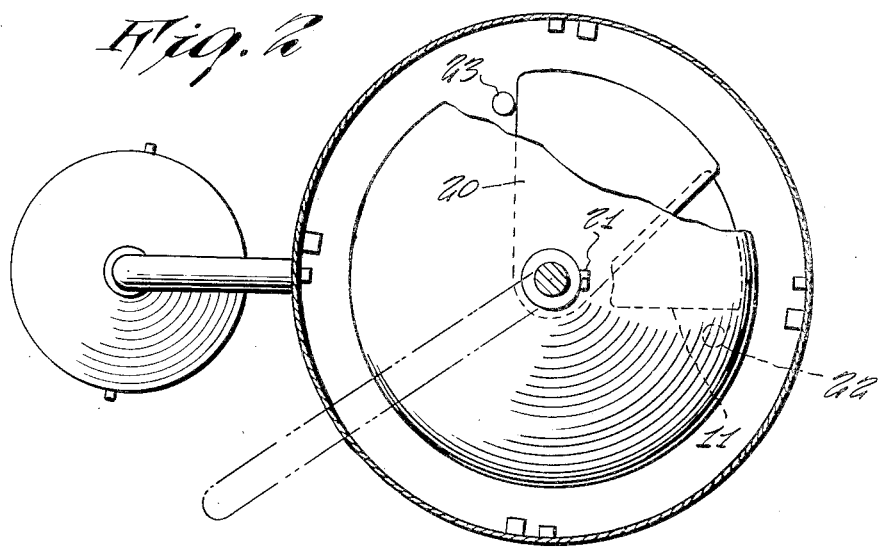
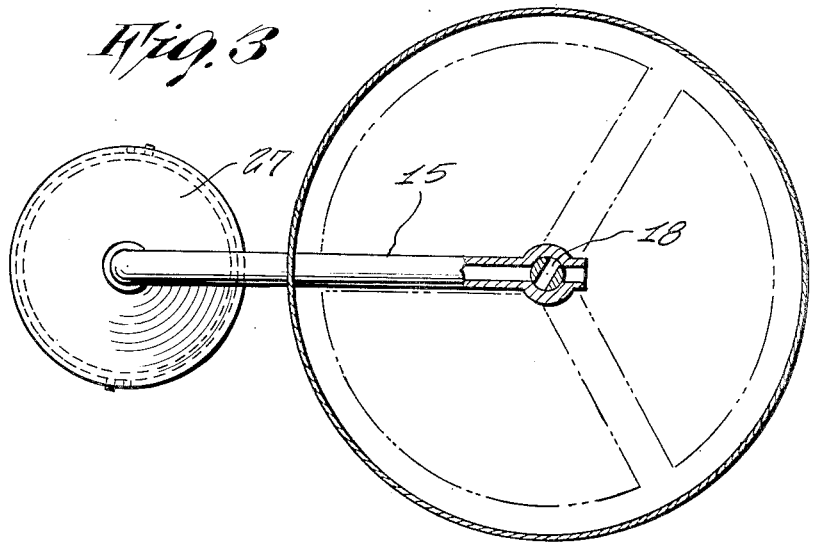
INVENTOR.
ALPHONSE F. ALBANO
BY
Moses, Nolte, Crews & Berry
ATTORNEYS United States Patent Office 2,711,727
Patented June 28, 1955

2,711,727

WATER HEATING APPARATUS

Alphonse F. Albano, Poughkeepsie, N. Y.

Application May 24, 1951, Serial No. 227,951

1 Claim. (Cl. 126—350)

This invention relates generally to water heating apparatus and more particularly to water heating apparatus having novel means for supplying heated water.

The invention has for an object the provision of a device of the class mentioned which is of simple, durable construction, desirable and efficient in action and which can be manufactured and sold at a reasonable cost.

The invention proposes the use of a water boiler provided with a superheated water or steam outlet pipe which may be connected for example with a container holding coffee or the like, and arranged for directing the superheated water or steam thoroughly and completely therethrough to make coffee.

The device is provided with means for heating the boiler and for manually shutting off part of the boiler so that the water in the lower part will become superheated and will pass through the connection and into the container as for example to extract coffee.

For further comprehension of the invention, of its objects and advantages, reference will be had to the following description, accompanying drawings and to the appended claim in which the various novel features of the invention are particularly set forth.

In the drawings:

Figure 1 is a front view of my device taken in cross-section;

Figure 2 is a top view taken on line 2—2 of Figure 1; and

Figure 3 is a view taken on line 3—3 of Figure 1.

Referring specifically to the drawings, the water heating apparatus comprises a tank 1 supported by legs 2 from a base 3. The tank 1 has a top cover 4 and a bottom plate 5 which supports a heating element 6 and a thermostat 7. In the lower half of the tank 1 is a partitioning member 8 supported by flanges 9 extending inwardly from the sides of the tank 1 which divides the tank 1 into two compartments A and B. A water level indicating tube 10 is disposed on the outside of the tank 1. The tank partitioning plate 8 has an opening 11 formed therein which opening allows ready communication between portions A and B of tank 1.

Centrally located on the underside of partitioning plate 8 is located a valve 12 extending downwardly into section B of tank 1. A valve operating member 13 extends upwardly from valve 12 through compartment A of tank 1 and the top plate 4 to form a handle 13a, as shown in Figure 1. A gasket 14 acts as a bearing for shaft 13.

Valve 12 includes a spout portion 15 extending through the side wall of tank 1, portion B, which is concentrically hollow to accommodate valving member 16 which is held in place by nut 17 at its lower portion. A hole 18 extends through the valving portion 16, as shown best in Figure 3, so that upon correct alignment of the hole and the bore in member 15, the liquid in chamber B is permitted to flow out of the chamber and for example, as set forth for the specific application shown herein, into container generally indicated at 19.

On the upper side of compartment plate 8 is a plate-like member 20 attached through a raised hub portion 20a to the valve stem 13 by means of set screw 21. It is therefore apparent that movement of the valve handle 13a will cause pivotal movement of the member 20 to cover or uncover, as the case may be, the opening 11 of partitioning member 8. Stops 22 and 23 are provided on plate 8 to restrict the valving movement of member 20.

A funnel-like member 24 is attached by means of set screw 25 onto shaft 13. This funnel is of such a size that projects beyond the vertical projection opening 11 in plate 8 so that steam bubbles rising through the opening are entrapped thereunder. Plate 20 is not intended to form a steam tight fit with the opening 11 and any steam which does escape into compartment A is caught under the hood 24 and retained thereunder until sufficiently cooled by the surrounding water to be dissolved therein. Container 19, attached by any known means at the end of spout 15, may be specifically adapted for example to hold coffee grounds 26 with suitable filter means at the bottom to prevent egress of the grounds and allow the liquid coffee to drain therethrough. At the lower end of chamber 28 is spout 29 which is adapted to communicate with a coffee pot or cup depending upon how much is being drawn from the coffee maker.

The operation of the device is as follows:

Both chambers A and B of tank 1 are filled through filling tube 30 with water up to any readily discernable depth as shown by gauge 10. Filling tube 30 is then covered by tube cap 31 to prevent foreign matter from entering the chambers. Communication by means of opening 11 is permitted between the two chambers and the heater 6 supplies the necessary energy to the water to substantially heat it to its boiling point.

For the above mentioned specific adaptation when it is desired to draw a cup of coffee, or any other amount of coffee, container 28 is filled with grounds corresponding to the regular well known coffee-water ratio. Then the valve handle 13a is rotated so that opening 11 is covered by plate 20, thus partitioning chamber A from chamber B, and at the same time opening valve 16, permitting water to flow from the chamber B and in the case of the aforementioned specific application, through the grounds containing compartment 28 and into a cup or other container. The water will not flow at the instant the valve is opened since the pressure of the water in chamber A has been dissociated from that in chamber B following the closing of the cover plate 20. Although cover plate 20 does not form a steam tight fit with the partitioning plate 8, it sufficiently precludes instantaneous flow of water from chamber A to chamber B due to the water pressure exerted on cover plate 20 by the water disposed in chamber A. After a suitable interval of a second or two, however, when sufficient pressure has been built up in chamber B by superheat of the water and partial steaming thereof, the pressure within chamber B forces water through the spout 15. After sufficient water has passed into ground containing container 28, the valve 16 is closed, permitting chambers A and B to be in communication again.

Hood 24 acts as safety trap catching any steam bubbles which may have escaped into chamber A during the superheating of the water in chamber B and retains them until they dissolve. Chamber A is vented by leaking about the gasket 14 as well as about the top cover 4 and the tube cap 31 to prevent building up of excessive or hazardous pressures within chamber A, from steam other than that entrapped under hood 24.

Having thus described my invention, what I claim as new and desire to secure by Letters Patent is:

In a device of the character described, a main boiler tank, a partitioning plate suspended in said tank and dividing said tank into upper and lower compartments, an opening in said partitioning plate, an operating shaft extending vertically through said partitioning plate and terminating in the handle, a movable cover overlying said opening and attached to said shaft, a valve inside the lower of said compartments adapted to be operated by said shaft, a spout for said valve terminating on the outside of said tank, an inverted funnel hood attached to said shaft and overlying the opening in said partitioning plate, heating means for boiling the liquid in the lower compartment, the construction and arrangement being such that rotation of the shaft to cover the opening in the partitioning plate by said cover concurrently opens said valve.

References Cited in the file of this patent

UNITED STATES PATENTS

| Number | Name | Date |
|---|---|---|
| 748,910 | Acker | Jan. 5, 1904 |
| 954,916 | Bewan | Apr. 12, 1910 |
| 1,016,339 | Larson | Feb. 6, 1912 |
| 1,133,618 | Clefton | Mar. 30, 1915 |
| 1,400,757 | Malusz | Dec. 20, 1921 |
| 1,472,551 | Capocci | Oct. 30, 1923 |
| 2,115,601 | Whitby et al. | Apr. 26, 1938 |
| 2,238,240 | Herman | June 30, 1942 |

FOREIGN PATENTS

| Number | Country | Date |
|---|---|---|
| 13,673 | Great Britain | of 1902 |
| 383,355 | France | Jan. 6, 1908 |
| 115,903 | Great Britain | May 23, 1918 |